United States Patent

Mooney et al.

Patent Number: 6,124,885
Date of Patent: Sep. 26, 2000

[54] FILM GATE AND SCANNER, AND METHOD OF SCANNING USING THE SCANNER

[75] Inventors: John Edward Mooney, Rochester; Clayton Grayson Johnson, Spencerport; Joseph Paul Palmer, Batavia, all of N.Y.

[73] Assignee: Eastman Kodak Company, Rochester, N.Y.

[21] Appl. No.: 08/770,843

[22] Filed: Dec. 20, 1996

[51] Int. Cl.[7] .................................................. H04N 5/253
[52] U.S. Cl. ............................... 348/96; 348/97; 359/196
[58] Field of Search ................................ 348/96, 97, 98, 348/207, 209, 232, 239, 373, 374, 375, 100, 195; 352/183; 355/72, 75; 359/196, 298; H04N 5/253

[56] References Cited

U.S. PATENT DOCUMENTS

| | | | |
|---|---|---|---|
| 1,220,195 | 3/1917 | Cocanari . | |
| 2,314,027 | 3/1943 | Young | 176/11 |
| 3,109,924 | 11/1963 | Frederick | 235/61.11 |
| 3,139,790 | 7/1964 | Kipping | 88/19.3 |
| 3,888,573 | 6/1975 | Easterly | 352/166 |
| 3,938,721 | 2/1976 | Staneck et al. | 226/75 |
| 4,105,199 | 8/1978 | Sata et al. | 271/122 |
| 4,105,316 | 8/1978 | Soding et al. | 353/109 |
| 4,292,621 | 9/1981 | Fuller | 340/146.3 |
| 4,320,963 | 3/1982 | Satomi | 350/162.19 |
| 4,410,247 | 10/1983 | Hirata et al. | 352/91 |
| 4,429,333 | 1/1984 | Davis et al. | 358/293 |
| 4,442,459 | 4/1984 | Fukui et al. | 358/286 |
| 4,623,937 | 11/1986 | Watanabe | 358/285 |
| 4,933,779 | 6/1990 | Milch | 358/489 |
| 4,963,997 | 10/1990 | VanScooter | 358/493 |
| 4,973,151 | 11/1990 | Bryant | 352/222 |
| 5,088,813 | 2/1992 | Wakefield | 352/183 |
| 5,146,341 | 9/1992 | Erck et al. | 358/214 |
| 5,153,733 | 10/1992 | Fetterman et al. | 358/214 |
| 5,235,381 | 8/1993 | Mamiki et al. | 355/72 |
| 5,256,868 | 10/1993 | Kaplan et al. | 250/208.1 |
| 5,313,249 | 5/1994 | Hochreiter et al. | 355/47 |
| 5,328,073 | 7/1994 | Blanding et al. | 226/27 |
| 5,328,074 | 7/1994 | Blanding | 226/55 |
| 5,522,785 | 6/1996 | Kedl et al. | 492/21 |
| 5,548,328 | 8/1996 | Wakefield | 348/98 |
| 5,572,339 | 11/1996 | Edgar et al. | 358/494 |
| 5,721,610 | 2/1998 | Kiten et al. | 355/75 |

FOREIGN PATENT DOCUMENTS

| | | |
|---|---|---|
| 57185041 | 11/1982 | Japan . |
| 08160482 | 6/1996 | Japan . |

*Primary Examiner*—Howard Britton
*Assistant Examiner*—Tung Vo
*Attorney, Agent, or Firm*—Thomas H. Close

[57] ABSTRACT

A film gate for transporting an elongated film therethrough, comprising:
  two spaced apart arcuate guide surfaces to engage against opposed edge margins of the film;
  a drive roller assembly, an idler roller assembly, and two elastic belts engaged around them to lie along respective arcuate surfaces from an entrance position, to an exit position defined by a nip between the drive roller assembly and the guide surfaces, so that upon rotation of the drive roller assembly opposite edge portions of the film can be transported in engagement between the belts and the arcuate guide surfaces from the entrance to exit positions. A scanner using such a film gate, and a method of scanning film using such a scanner, are also provided.

13 Claims, 2 Drawing Sheets

FILM GATE AND SCANNER, AND METHOD OF SCANNING USING THE SCANNER

FIELD OF THE INVENTION

The invention relates to the field of film scanners.

BACKGROUND OF THE INVENTION

Scanners convert hard copy analog images on a media such as a transparent film, into corresponding electrical image signals (typically digital image signals). The use of scanners has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, an image frame is typically scanned with a light beam or line, and the light transmitted through the image is detected, typically as three primary color light intensity signals, and digitized. The digitized values may be formatted to a standard for video display and stored on optical or magnetic media. Such scanners (sometimes referenced as "film digitizers") take a variety of forms and the various common aspects of film digitizing, particularly line illumination and linear CCD-based digitizers, are described in greater detail in U.S. Pat. No. 5,012,346. The region through which a film is passed for scanning is often referenced as a film gate.

In scanning film, it is imperative to drive the film at an extremely constant velocity in addition to providing film flatness at the scan area (that is, the area from which light from the light source passes through the film and is received by the sensor). Failure to drive the film at a constant velocity (such as might result from film slippage) can result in an actual line of the image reaching the sensor, being considered by the digital electronics processing to be an image at a different location on the film. The digital image corresponding to the scanned image, will therefore be distorted. On the other hand, failure to maintain film flatness at the area or line being scanned, results in some parts of the scanned area or line being in focus on the sensor, while other parts are not. Thus, the resulting digital image will contain portions which are out of focus.

Rotary film gates have been developed as described in U.S. Pat. No. 5,088,813 and U.S. Pat. No. 5,153,733 which can alleviate the above problems. Those patents disclose film gates which include two concentric discs which support the film at edge margins while guiding it through the gate. Two elongated belts hold the film in position adjacent an arc of the discs. The curvature forced on the film as it passes through the rotary film gate causes it to be flat in a line across it at which scanning takes place. The described scanner of U.S. Pat. No. 5,153,735 drives the two discs directly with a servo motor. However, with this arrangement the size of the motor must be relatively large in order to provide the necessary torque. Use of a servo motor also requires an encoder to provide accurate feedback information on the motor velocity. Even if the servo motor was replaced with a stepper motor, a large motor would still be needed for the necessary torque. Further, since from a given stepper motor and associated drive circuitry only a limited number of steps per revolution can be obtained, such a direct drive arrangement would only allow relatively large stepped movement of a film through the gate and hence only relatively low scanning resolution could be obtained.

The rotary gate described in U.S. Pat. No. 5,088,813 can alleviate the foregoing problem, since the two discs which support the film are not driven directly by the motor, but are caused to rotate by a motor rotating a shaft of smaller diameter than the two discs through a pair of belts. The device described in U.S. Pat. No. 5,088,813 uses two non-stretch belts. Such non-stretch belts transmit the exact velocity of the motor to the discs without variations occurring due to belt stretch. However, because such belts are non-stretch, in order to maintain the necessary contact between them and the discs it is typically necessary in practice to provide a belt tensioning mechanism which can be loosened for belt removal or installation, and tightened for operation. Furthermore, rigid belts need to be matched with fairly high precision, and run on precision idlers with close size and location tolerances. All of the foregoing considerations add to the cost of constructing a scanner using rotary gates.

It would be desirable then to have a film scanner with a rotary gate or similar film gate, which is relatively simple to construct, does not require high precision in component location, and on which the belts can be readily installed during assembly of the scanner and during field replacement.

SUMMARY OF THE INVENTION

The present invention, then, provides in one aspect, a film gate which can transport an elongated film through the gate. The film gate comprises:

two spaced apart arcuate guide surfaces to engage against opposite edge margins of the film;

a drive roller assembly, an idler roller assembly, and two elastic belts engaged around them to lie along respective arcuate surfaces from an entrance position, to an exit position defined by a nip between the drive roller assembly and the guide surfaces, so that upon rotation of the drive roller assembly opposite edge portions of the film can be transported in engagement between the belts and the arcuate guide surfaces from the entrance to exit positions.

A film gate of the present invention can be used in a scanner which, in addition to the film gate, comprises:

b) a drive means to rotate the drive roller assembly;

c) a light source to illuminate a film at a position between the entrance and exit positions; and d) a sensor to receive light from the source which has passed through the film.

The present invention further provides a method of scanning an elongated film using a scanner of the present invention.

A film gate and a scanner of the present invention, provide a means by which a film can be maintained flat on a region being scanned. The film gate can use a relatively small drive motor and still maintain high precision of movement of the film through a film gate. The construction of the film gate is relatively simple and the belts can be readily replaced, while slippage between the film and the drive mechanism is maintained at low or no likelihood.

BRIEF DESCRIPTION OF THE DRAWINGS

To facilitate understanding, identical reference numerals have been used, where possible, to designate identical elements that are common to the figures.

EMBODIMENTS OF THE INVENTION

Figure 1:
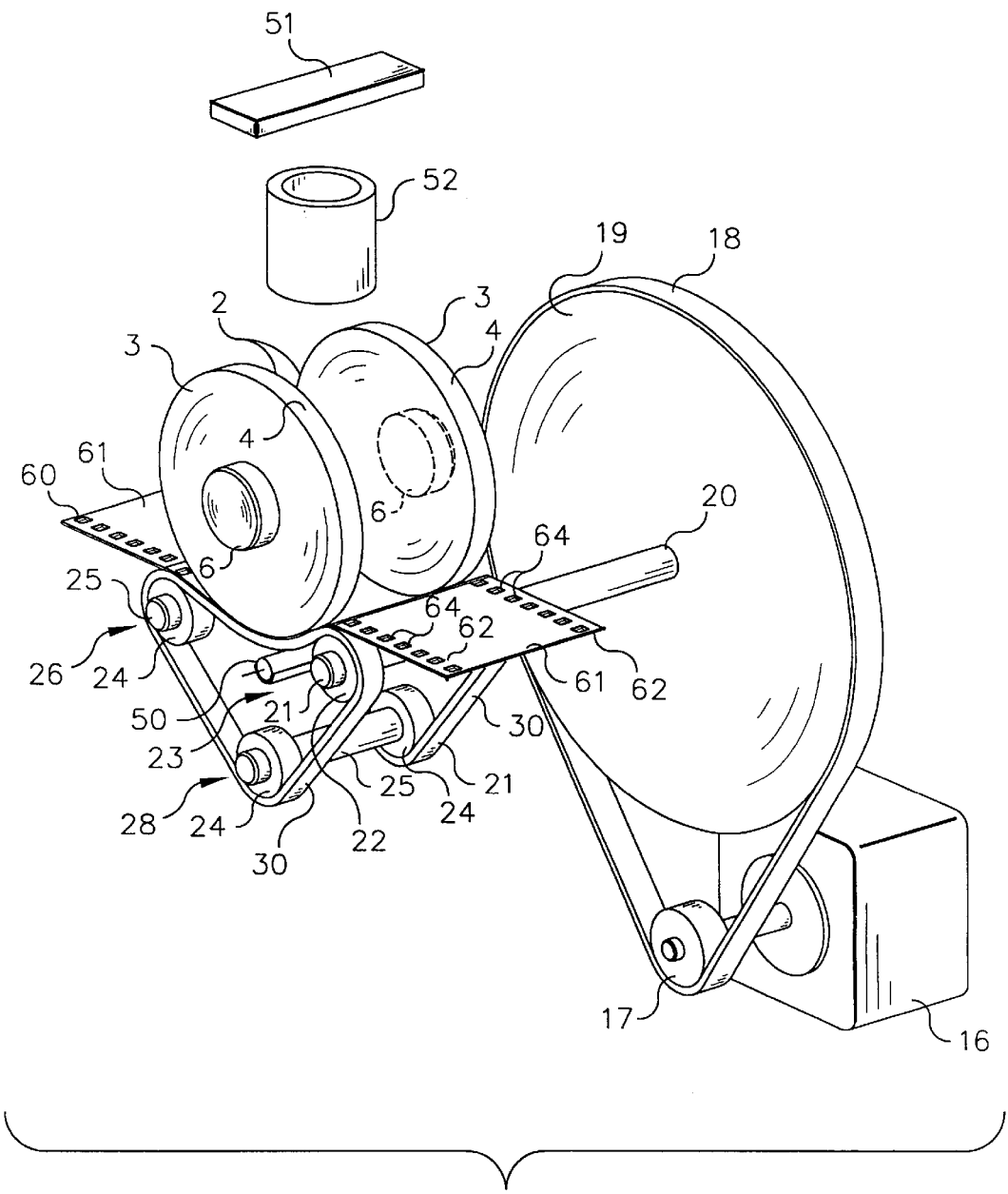
FIG. 1 is a perspective view of a scanner of the present invention, particularly showing the rotary film gate.
Figure 2:
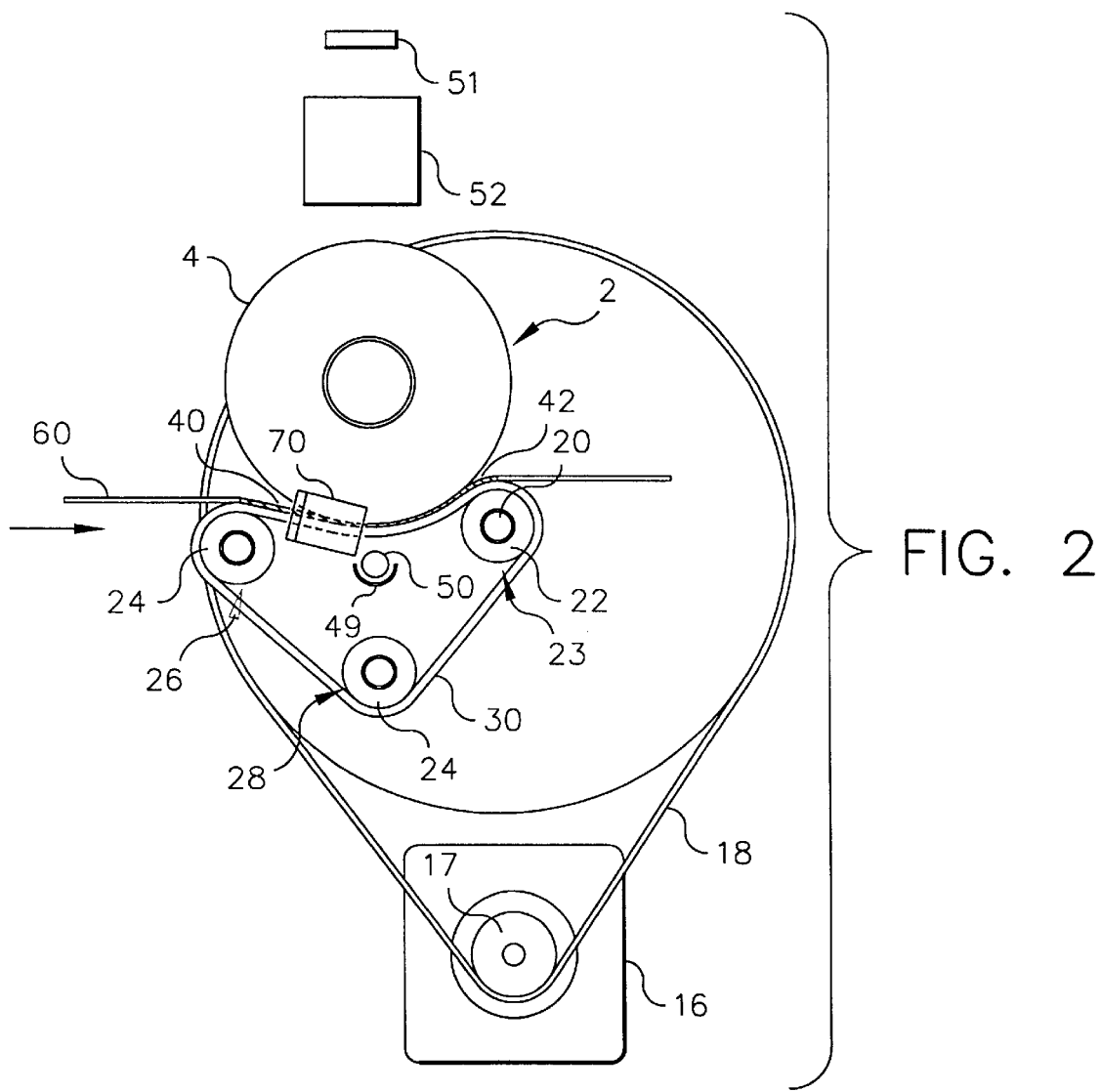
FIG. 2 is a side view of the scanner as shown in FIG. 1.

Referring to FIGS. 1 and 2, the film scanner shown is constructed for scanning an elongated film 60. Film 60 has opposite edge margins 62 often carrying a series of sprocket holes 64, although in the recently introduced Advanced Photo System films, there may be no sprocket holes (although there may be similar holes for frame location). Between edge margins 62 is an image area 61 carrying a series of images to be scanned. Film 60 can be 35 mm, Advanced Photo System film, movie film, or any other elongated film, the major components of a film scanner of the present invention are shown. Film 60 is transparent so that the images can be viewed through it. Known components of film scanners, such as the necessary electronics hardware, scanner housing and film strip holders have not been shown for simplicity. The scanner shown in FIGS. 1 and 2 includes a film gate (sometimes referenced as a "transport mechanism") with two co-axial film plane idler wheels 2. Wheels 2 are spaced apart so that their circumferences 4 can engage against respective edge margins 62 of elongated film 60. Wheels 2 are rotatably mounted through respective shafts 6 on a suitable support within the scanner. Wheels 2 are typically about 2.5 cm in radius, and can be made of metal or any suitable material.

A drive roller assembly 23 includes two drive rollers 22, which are fixedly spaced apart on a drive shaft 20 by a distance equal to the spacing of wheels 2 so as to lie adjacent to respective circumferences 4 of wheels 2. The circumference of each drive roller 22 is flat. Drive shaft 20 is rotatably mounted at end 21, and can be rotated by an electric motor 16 through a single stage belt and pulley reduction transmission composed of pulleys 17 and 19 and a belt 18 engaged around them. To maintain precise control over the rotational motion of wheels 2, motor 16 is preferably a stepper motor. However, other motors such as a DC servo motor, could be used. A first idler roller assembly 26 and a second idler roller assembly 28 both consist of two rollers 24. Rollers 24 are fixedly spaced apart on a rotatably mounted shaft 25 by a distance equal to the spacing between wheels 2. Note that first idler roller assembly (that is, idler rollers 24) is spaced apart from the circumferences 4 a distance sufficient to provide a gradual engagement area for film 60 to enter entrance position 40. Each of rollers 24 is a crown roller, that is they have a greater diameter toward the middle of their circumference than on edges to maintain the correct belt path. Two elastic belts 30 are engaged about drive rollers 22 and both sets of idler rollers, as shown in FIGS. 1 and 2. The drive roller assembly 23 and first idler roller assembly 26 are positioned so that belts 30 lie along and in contact with respective arcuate portions of circumferences 4 of wheels 2.

Where belts 30 come in contact with circumferences 4 of wheels 2, this defines an entrance position 40 for film 60. On the other hand, an exit position 42 for film 60 is defined by a nip between drive rollers 22 and circumferences 4. That is, drive rollers 22 are so positioned as to apply a pressure to belts 30 against circumferences 4 at exit position 42. The elastic nature of belts 30 allows them to compress somewhat between drive rollers 22 and circumferences 4 of wheels 2. Belts 30 are preferably made of urethane of about 40 to 100 durometer A scale. The final pressure on belts 30 between drive rollers 22 and wheels 2 should be between about 1.5 and 5 pounds. Any given system should be optimized for sufficient traction while ensuring belts 30 remain at the nip, and without too much drag.

Figure 3:
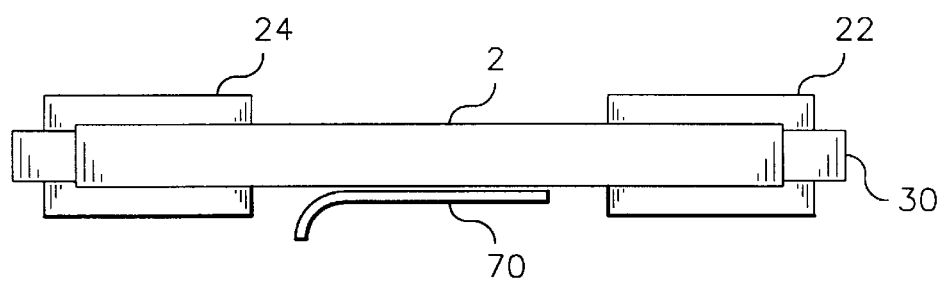

A curved plate 70 is provided adjacent the outside 3 of each wheel 2, adjacent a lower part of the circumference 4. One such plate can be seen in FIGS. 2 and 3, but is not shown in FIG. 1 for simplicity. The curved part of plates 70 provide an additional guide element for film entry while the flat part prevents film 60 from moving outward from between belts 30 and wheels 2.

The scanner also includes an elongated fluorescent light tube 50 positioned within the confines of elastic belts 30 and extending parallel to an axis about which wheels 2 rotate (which will be defined by the centers of shafts 6). Fluorescent tube 50 is positioned within about 2.5 cm (and preferably within 1 cm) from film 60 as it passes through the rotary gate of the scanner. Fluorescent tube 50 is of a length which is greater than the spacing between the wheels 50. This is because while light intensity along most of the length of tube 50 is sufficiently even for scanning purposes, there is substantial light intensity variation at the ends of tube 50. Since even illumination is required for scanning an image on film 60, any effect from the intensity variation at the ends of tube 50 is substantially eliminated by ensuring tube 50 is long enough so that its ends are beyond wheels 2 (and hence beyond image area 61 of film 60). A curved reflector 49 is provided to direct light from fluorescent tube 50 toward film 60. Fluorescent tube 50 may be any suitable fluorescent tube which can provide a narrow line of illumination of fairly high intensity, high uniformity (except perhaps at the ends of the tube), and correct color characteristics for scanning. A particularly suitable tube is referenced as sub-miniature or compact fluorescent lamps suitable for illuminating film for scanning, such as model number UFL-31070SC103, made by Ushio, Japan.

A tri-linear sensor 51 is positioned to receive light from tube 50 which has passed through film 60, between wheels 2, and through a lens assembly 52. Sensor 51 has three linear sensors, such as Charge Coupled Devices ("CCDs"), with red, green and blue filters positioned in front of respective ones so that each one receives light only in one of the foregoing regions. Other sensor arrangements are possible as will be appreciated by those familiar with film scanners. Suitable electronic hardware and software is provided to convert the electrical signals generated by sensor assembly 51 into a digital signal.

In operation, drive rollers 22 are rotated clockwise as viewed in FIG. 2, by electric motor 16. This in turn causes belts 30 to rotate clockwise about idler rollers 24 of the first and second idler roller assemblies. As well, because of the nip between the drive rollers 22 and wheels 2 in which elastic belts 30 are caught and somewhat compressed, wheels 2 will be positively driven in a counterclockwise direction as viewed in FIG. 2. Film 60 is fed toward entrance position 40 by any suitable guide, such as an elongated guide channel (not shown) of width only slightly greater than film 60, in alignment with wheels 2. Because rollers 24 of first idler roller assembly 26 are spaced apart from wheels 2, entrance position 40 narrows gradually thereby assisting in guiding film 60 into position so that its edge margins 62 are captured between belts 30 and wheels 2. As will then be apparent, belts 30 and wheels 2, form an arcuate transport which can grip edge margins 62 in engagement between them, and cause film 60 to be transported from entrance position 40 to exit position 42. Film 60 can be deposited at the exit position onto any suitable guide or holder, such as an elongated guide channel (not shown) of width only slightly greater than film 60, in alignment with wheels 2.

With belts 30 being elastic, the actual precision velocity of film 60 will be caused by the nip between drive rollers 22 and wheels 2, while belts 30 between entrance position 40 and exit position 42 will constrain film 60 to conform to the curve of wheels 2. Thus, at any given time a line across film 60 which is adjacent tube 50, is now confined to a precisely controlled distance from lens 52 and rendered flat because of conforming to the arc of film plane wheels 2. At the nip at the exit position 42, the steady, precise velocity of the drive system is faithfully transmitted to the film 60 by way of the nip force between drive rollers 22 and film plane wheels 2. This nip force is effectively supplied by the elastomeric properties of belts 30 as they are compressed in the nip at exit position 42. Thus, belts 30 are rendered traction and spring force components and are not being used in an ordinary fashion. Belts 30 are elastic as opposed to being rigid. This offers the following advantages: lower initial belt cost, no tensioning mechanism is required to supply the nip force or to otherwise hold belts 30 in position, less precision is required for dimensioning and placement of idler rollers 24 of the first and second idler roller assemblies, and replacement of belts 30 can be accomplished simply by slipping them off all rollers and replacing them back over all rollers.

It will also be appreciated that due to the reduction accomplished by drive rollers 22 acting to indirectly drive wheels 2, a considerable reduction from motor 16 is accomplished. An even further reduction is accomplished by the single stage transmission formed from belt 18 and pulleys 17 and 19. This reduction allows the use of a relatively small stepper motor 16 while providing very precise movements of film 60 through the film gate. Such precise motion ensures accurate fine metering of film 60 for high resolution scanning. When a complete image frame on film 60 has passed beneath fluorescent tube 50, the output from sensor 51 will be converted by the necessary hardware and software to a digital image signal corresponding to that image frame.

The invention has been described with reference to a preferred embodiment. However, it will be appreciated that variations and modifications can be effected by a person of ordinary skill in the art without departing from the scope of the invention.

PARTS LIST

2 Wheels
3 Outside
4 Circumferences
6 Shafts
16 Motor
17, 19 Pulleys
18,30 Belt
20 Drive Shaft
21 End
22 Rollers
23 Roller Assembly
24 Rollers
25 Shaft
26 Roller Assembly
28 Roller Assembly
40 Entrance Position
42 Exit Position
49 Reflector
50 Tube
51 Sensor
52 Lens
60 Film
61 Image Area
62 Margins
64 Sprocket Holes
70 Plates

We claim:
1. A film gate for transporting an elongated film therethrough, comprising:
two spaced apart arcuate guide surfaces to engage against opposed edge margins of the film;
a drive roller assembly wherein circumference surfaces of said drive rollers are flat, an idler roller assembly wherein said idler rollers are crown rollers, and two elastic belts engaged around them to lie along respective arcuate surfaces from an entrance position, to an exit position defined by a nip between the drive roller assembly and the guide surfaces, so that upon rotation of the drive roller assembly opposite edge portions of the film can be transported in engagement between the belts and the arcuate guide surfaces from the entrance to exit positions.

2. A film gate according to claim 1 wherein the arcuate guide surfaces are defined by respective portions of two axially spaced rotatable film plane idler wheels, which wheels are caused to rotate upon rotation of the drive roller assembly by the drive means.

3. A film scanner comprising:
a) a film gate for transporting an elongated film therethrough, comprising:
two spaced apart arcuate guide surfaces to engage against opposed edge margins of the film;
a drive roller assembly wherein circumference surfaces of said drive rollers are flat, an idler roller assembly wherein said idler rollers are crown rollers, and two elastic belts engaged around them to lie along respective arcuate surfaces from an entrance position, to an exit position defined by a nip between the drive roller assembly and the guide surfaces, so that upon rotation of the drive roller assembly opposite edge portions of the film can be transported in engagement between the belts and the arcuate guide surfaces from the entrance to exit positions;
b) a drive means to rotate the drive roller assembly;
c) a light source to illuminate a film at a position between the entrance and exit positions; and
d) a sensor to receive light from the source which has passed through the film.

4. A film scanner according to claim 3 wherein the arcuate guide surfaces are defined by respective portions of two axially spaced rotatable film plane idler wheels, which wheels are caused to rotate upon rotation of the drive roller assembly by the drive means.

5. A film scanner according to claim 3 wherein the drive means comprises a motor and a reduction transmission.

6. A film scanner according to claim 3 wherein the idler roller assembly is spaced apart from the film plane idler wheels.

7. A film scanner according to claim 3 wherein the light source is an elongated fluorescent tube positioned within the confines of the elastic belts.

8. A film scanner according to claim 7 wherein the fluorescent tube extends beyond the film plane idler wheels.

9. A film scanner according to claim 7 wherein the fluorescent tube is positioned within 1 cm of a film transported through the film gate.

10. A film scanner according to claim 5 wherein the reduction transmission is a single stage belt and pulley transmission.

11. A method of scanning an elongated film using an apparatus of claim 3, comprising:
causing the drive means to rotate the drive roller assembly so that opposite edge portions of the film are caused to be transported in engagement between the belts and the arcuate guide surfaces from the entrance to exit positions;

illuminating the film with the light source, at a position between the entrance and exit positions;

receiving light from the light source which has passed through the film and converting the received light to an electrical signal representation of an image on the film.

12. A method of scanning an elongated film using an apparatus of claim 4, comprising:

causing the drive means to rotate the drive roller assembly so that opposite edge portions of the film are caused to be transported in engagement between the belts and the arcuate guide surfaces from the entrance to exit positions;

illuminating the film with the light source, at a position between the entrance and exit positions;

receiving light from the light source which has passed through the film and converting the received light to an electrical signal representation of an image on the film.

13. A method of scanning an elongated film using an apparatus of claim 6, comprising:

causing the drive means to rotate the drive roller assembly so that opposite edge portions of the film are caused to be transported in engagement between the belts and the arcuate guide surfaces from the entrance to exit positions;

illuminating the film with the light source, at a position between the entrance and exit positions;

receiving light from the light source which has passed through the film and converting the received light to an electrical signal representation of an image on the film.

* * * * *